US009026651B2

(12) United States Patent
He

(10) Patent No.: US 9,026,651 B2
(45) Date of Patent: May 5, 2015

(54) AUTOMATIC PERFORMANCE AND CAPACITY MEASUREMENT FOR NETWORKED SERVERS

(71) Applicant: Sony Computer Entertainment America LLC, San Mateo, CA (US)

(72) Inventor: Shawn He, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 41 days.

(21) Appl. No.: 14/038,572

(22) Filed: Sep. 26, 2013

(65) Prior Publication Data
US 2014/0032749 A1 Jan. 30, 2014

Related U.S. Application Data

(63) Continuation of application No. 13/114,294, filed on May 24, 2011, now Pat. No. 8,589,480.

(51) Int. Cl.
*G06F 15/16* (2006.01)
*H04L 12/26* (2006.01)

(52) U.S. Cl.
CPC ............ *H04L 43/08* (2013.01); *H04L 43/0817* (2013.01); *H04L 43/50* (2013.01)

(58) Field of Classification Search
CPC ...... H04L 43/0817; H04L 43/50; H04L 43/08
USPC ......................................... 709/224
See application file for complete search history.

(56) References Cited

U.S. PATENT DOCUMENTS

| 6,389,448 | B1 | 5/2002 | Primak et al. | |
|---|---|---|---|---|
| 6,445,707 | B1 | 9/2002 | Iuoras et al. | |
| 6,584,502 | B1 | 6/2003 | Natarajan et al. | |
| 6,687,735 | B1 | 2/2004 | Logston et al. | |
| 6,748,020 | B1 | 6/2004 | Eifrig et al. | |
| 6,769,024 | B1 | 7/2004 | Natarajan et al. | |
| 6,952,568 | B2 | 10/2005 | Lin | |
| 6,973,034 | B1 | 12/2005 | Natarajan et al. | |
| 6,983,317 | B1 * | 1/2006 | Bishop et al. | 709/223 |
| 7,231,436 | B1 * | 6/2007 | Dalfo et al. | 709/223 |
| 7,650,402 | B1 * | 1/2010 | Batz et al. | 709/224 |
| 7,760,626 | B2 | 7/2010 | Malpani et al. | |
| 7,761,546 | B2 * | 7/2010 | McAfee | 709/223 |
| 7,970,872 | B2 * | 6/2011 | Liu et al. | 709/220 |
| 8,112,471 | B2 * | 2/2012 | Wei et al. | 709/202 |

(Continued)

OTHER PUBLICATIONS

International Preliminary Report on Patentability issued in copending application No. PCT/US2012/038668 on Nov. 26, 2013.

*Primary Examiner* — Khaled Kassim
*Assistant Examiner* — Syed S Ali
(74) *Attorney, Agent, or Firm* — Procopio, Cory, Hargreaves & Savitch, LLP

(57) ABSTRACT

Measuring performance and capacity of a networked server coupled to a cluster of client machines, including: initializing each client machine of the cluster of client machines with a number of client applications; performing a first feedback process of configuring the number of client applications for the each client machine such that each client application adjusts its own operation to achieve a first balance point of a client application count for the each client machine; and performing a second feedback process in which the networked server and the cluster of client machines achieve a second balance point of a client machine count for the networked server.

16 Claims, 4 Drawing Sheets

(56) References Cited

U.S. PATENT DOCUMENTS

| | | | |
|---|---|---|---|
| 8,184,534 | B2 | 5/2012 | Plamondon |
| 8,521,853 | B2 * | 8/2013 | Rathunde et al. ............. 709/221 |
| 8,555,295 | B2 * | 10/2013 | Karino et al. ................. 719/328 |
| 8,799,918 | B2 * | 8/2014 | Sen .............................. 718/105 |
| 2005/0038891 | A1 | 2/2005 | Martin |
| 2006/0112170 | A1 * | 5/2006 | Sirkin ........................... 709/217 |
| 2006/0174238 | A1 | 8/2006 | Henseler et al. |
| 2006/0212556 | A1 * | 9/2006 | Yacoby et al. ................ 709/223 |
| 2008/0195755 | A1 | 8/2008 | Lu et al. |
| 2009/0112972 | A1 | 4/2009 | Liu |
| 2009/0264103 | A1 | 10/2009 | Chen et al. |
| 2010/0228819 | A1 | 9/2010 | Wei |
| 2011/0106949 | A1 | 5/2011 | Patel et al. |
| 2011/0208854 | A1 | 8/2011 | Zhang et al. |
| 2011/0276685 | A1 * | 11/2011 | de Waal et al. ............... 709/224 |
| 2012/0166616 | A1 * | 6/2012 | Meehan et al. ................ 709/224 |
| 2012/0275553 | A1 | 11/2012 | Lehane et al. |

* cited by examiner

AUTOMATIC PERFORMANCE AND CAPACITY MEASUREMENT FOR NETWORKED SERVERS

CROSS-REFERENCE TO RELATED APPLICATIONS

The present application is a continuation application of co-pending U.S. patent application Ser. No. 13/114,294, filed May 24, 2011, entitled "Automatic Performance and Capacity Measurement for Networked Servers." The disclosure of the above-referenced application is incorporated herein by reference.

BACKGROUND

1. Field of the Invention

The present application relates to networks and networked servers, and more specifically, to measuring performance of networked servers.

2. Background

Networked servers may be used for a wide variety of applications, including online games. The performance of networked servers is critical and therefore measuring the performance and the capacity of networked servers is important. However, many of the current methods to measure performance and capacity of networked servers are inefficient and inaccurate because they are too labor-intensive and iteratively process networked servers one at a time.

SUMMARY

Implementations of the present application provide for automatic performance measuring for networked servers.

In one implementation, a method of measuring performance and capacity of a networked server is disclosed. The method includes: initializing each client machine of the cluster of client machines with a number of client applications; performing a first feedback process of configuring the number of client applications for said each client machine such that each client application adjusts its own operation to achieve a first balance point of a client application count for said each client machine; and performing a second feedback process in which the networked server and the cluster of client machines achieve a second balance point of a client machine count for the networked server.

In another implementation, a system to measure the capacity and performance of a networked server is disclosed. The system includes: at least one server arranged in a server feedback loop, wherein the server feedback loop is configured to achieve a first balance point of a client machine count; a cluster of client machines coupled to the at least one server, each client machine initialized with a number of client applications and arranged in a client machine feedback loop, wherein the client machine feedback loop is configured such that each client application adjusts its own operation to achieve a second balance point of a client application count for said each client machine.

In a further implement, a non-transitory computer-readable storage medium storing a computer program, the computer program including executable instructions that cause a computer to measure performance and capacity of a networked server is disclosed. The computer program includes executable instructions that cause a computer to: initialize each client machine of the cluster of client machines with a number of client applications; perform a first feedback process of configuring the number of client applications such that each client application adjusts its own operation to achieve a first balance point of a client application count for said each client machine; and perform a second feedback process in which the networked server and the cluster of client machines achieve a second balance point of a client machine count for the networked server.

Other features and advantages of the present application will become more readily apparent to those of ordinary skill in the art after reviewing the following detailed description and accompanying drawings.

DETAILED DESCRIPTION

Certain implementations as disclosed herein provide for automatic performance and capacity measurement for networked servers. In one implementation, automatic performance and capacity measurement for the networked servers/applications is based on the automatically adjusted feedback of the networked clients. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

A networked server capacity/performance test can be run to find the maximum count of clients which the server can support while each client works as it is designed, without failing or encountering problems. Thus, networked servers are measured in terms of latency, and the performance and capacity for each of many clients is measured manually. Also, the capacity and response of a networked server is tested by overflowing it. This may also be done for each client, one at a time, by throttling backflows or bursts. Further, an array of faux clients may be arranged to take a series of throttling bursts, and the clients may then choose to coordinate by themselves based on the measurement of clients or coordinate responses by means of client feedback. However, each client may not be powerful enough or may not be able to adjust itself before reaching its full capacity. Further, the process of executing large scale testing on networked servers to measure performance and capacity may take an unduly large number of iterations. There are also bandwidth limitations that limit the clients on the networked servers. For example, in an online game context, the number of players a networked server can handle is limited by the available bandwidth.

Figure 1:
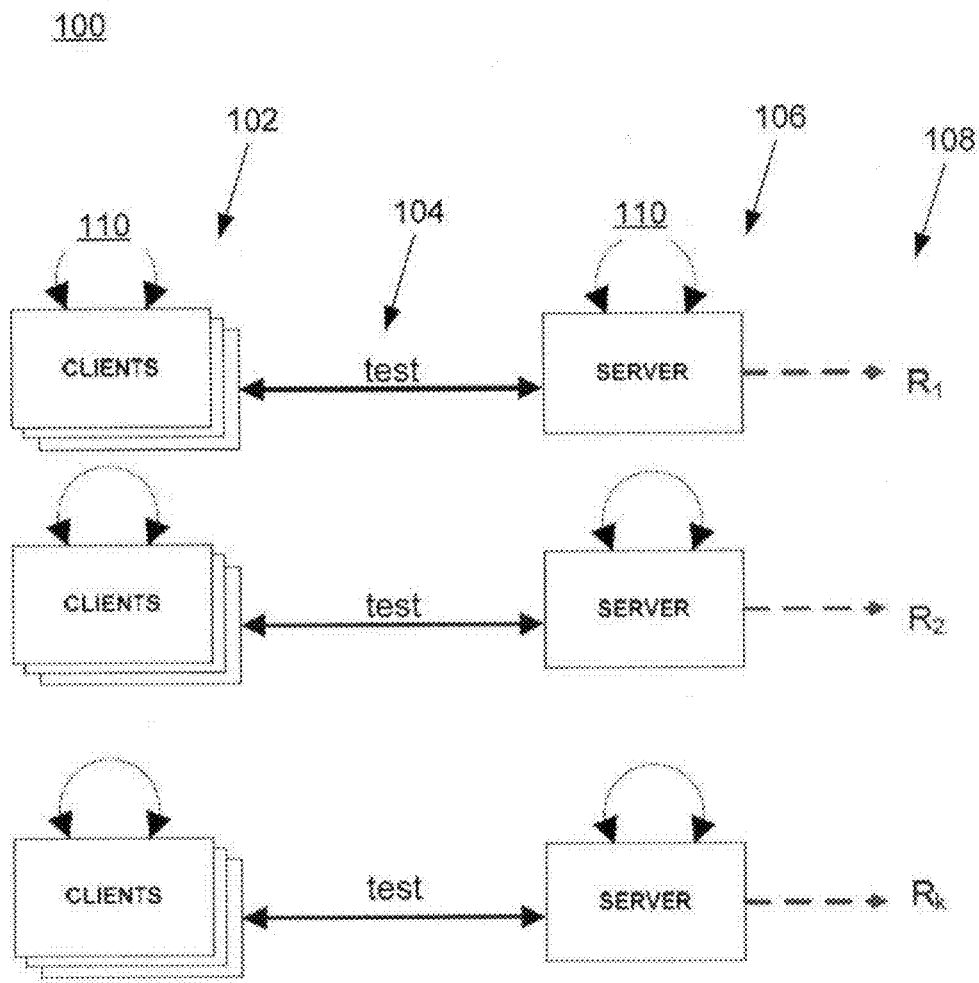
FIG. 1 shows a conventional setup in which performance and capacity of networked servers may be tested.

FIG. 1 shows a conventional setup 100 in which performance and capacity of networked servers may be tested. The setup 100 shows clusters of clients 102, each cluster being run through a test 104 by at least one server 106 to produce a result 108. Measurements 110 are performed by each of the clusters of clients 102 and the servers 106. Each client may also run a fixed number of client applications where each client application uses a pre-determined fixed number of different types of operations to communicate with the server. Based on the test results 108, parameters such as the number of clients, the number of client applications, and the type of operations can be adjusted accordingly to increase or decrease the server capacity/performance metrics. However, the iterative-based process of measuring server performance/capacity has several disadvantages.

One of the disadvantages is that the machines for the clients may not necessarily be homogeneous even with the same specifications. For example, each machine could be varied depending on its current load and state, so running a same fixed number of client applications on the machines does not guarantee the same results. Hence, it would be a labor intensive "trial and error" approach to find the exact number of clients each machine would be able to host without compromising or lessening the client's performance validity. Another disadvantage is that the server capacity/performance measurement is only accurate as the granularity of the test it is run through. Therefore, the test often does not get the full potential of the server capacity and therefore results in a limited representation of all aspects of the server application.

Figure 2:
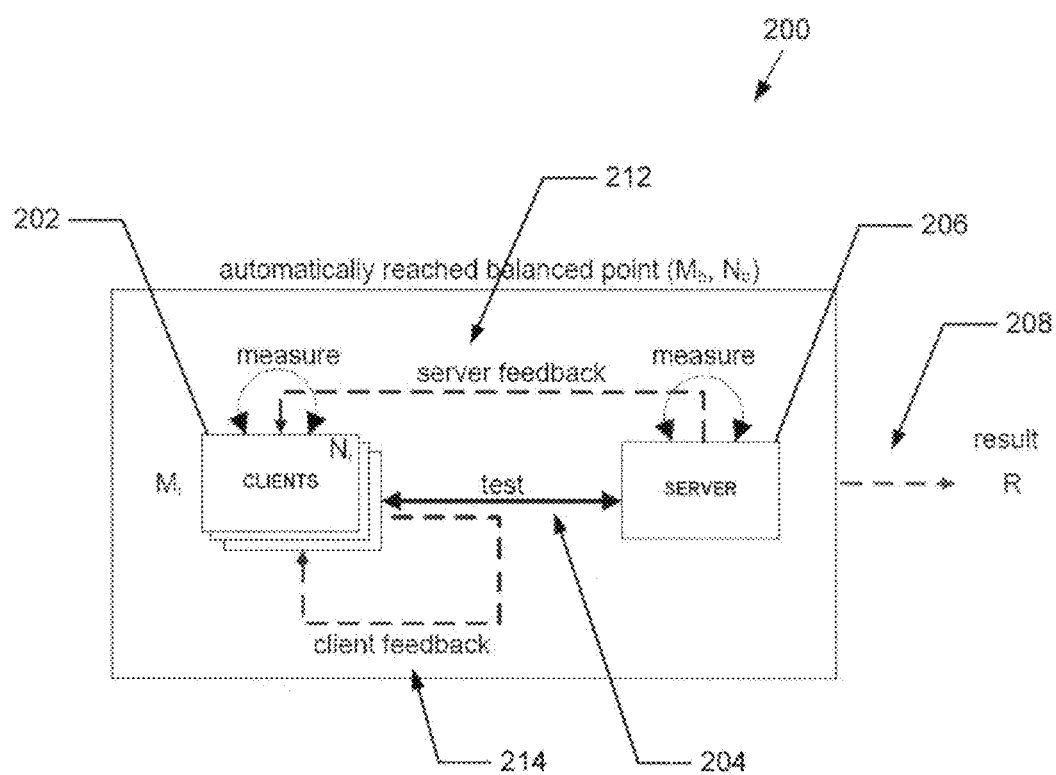
FIG. 2 is a diagram showing a feedback-based method used to measure the performance and capacity of networked servers in accordance with one implementation of the present application.

Accordingly, it is desirable to provide automatic performance and capacity measurement for the networked servers/applications based on the automatically adjusted feedback of the networked clients. FIG. 2 is a diagram 200 showing a feedback-based method used to measure the performance and capacity of networked servers in accordance with one implementation of the present application. The diagram 200 shows a cluster of clients 202 and at least one server 206. In one implementation, the clients and servers are simulated.

Each client machine in the cluster of clients 202 may start with an initial number of client applications where each client application uses an initial count of different type of operations to communicate with a server 206. Each client machine also generates a feedback 214 of the current state of the machine and the overall behavior of the client applications. Based on the feedback 214, each client application may then self adjust its own operation. That is, the client application may decide on its own to change to a different operation type, to exit the test to free up resources for other clients, or to increase the number of client applications on the client machine. Therefore, based on the configured requirements, each machine in the cluster of clients 202 comes to a balance point ($N_b$) of a client application count for that machine. Further, if a test 204 starts with a large client machine count of the cluster of clients 202, the maximum count of clients with desired behavior can be achieved for a server via the feedback process 212 to reach a balance point ($M_b$) of a client count for that server. The result 208 of the balance points of the client count ($M_b$) and the client application count ($N_b$) are output, and the measurement of the server capacity and performance is completed automatically without having to perform iterative runs.

Figure 3:
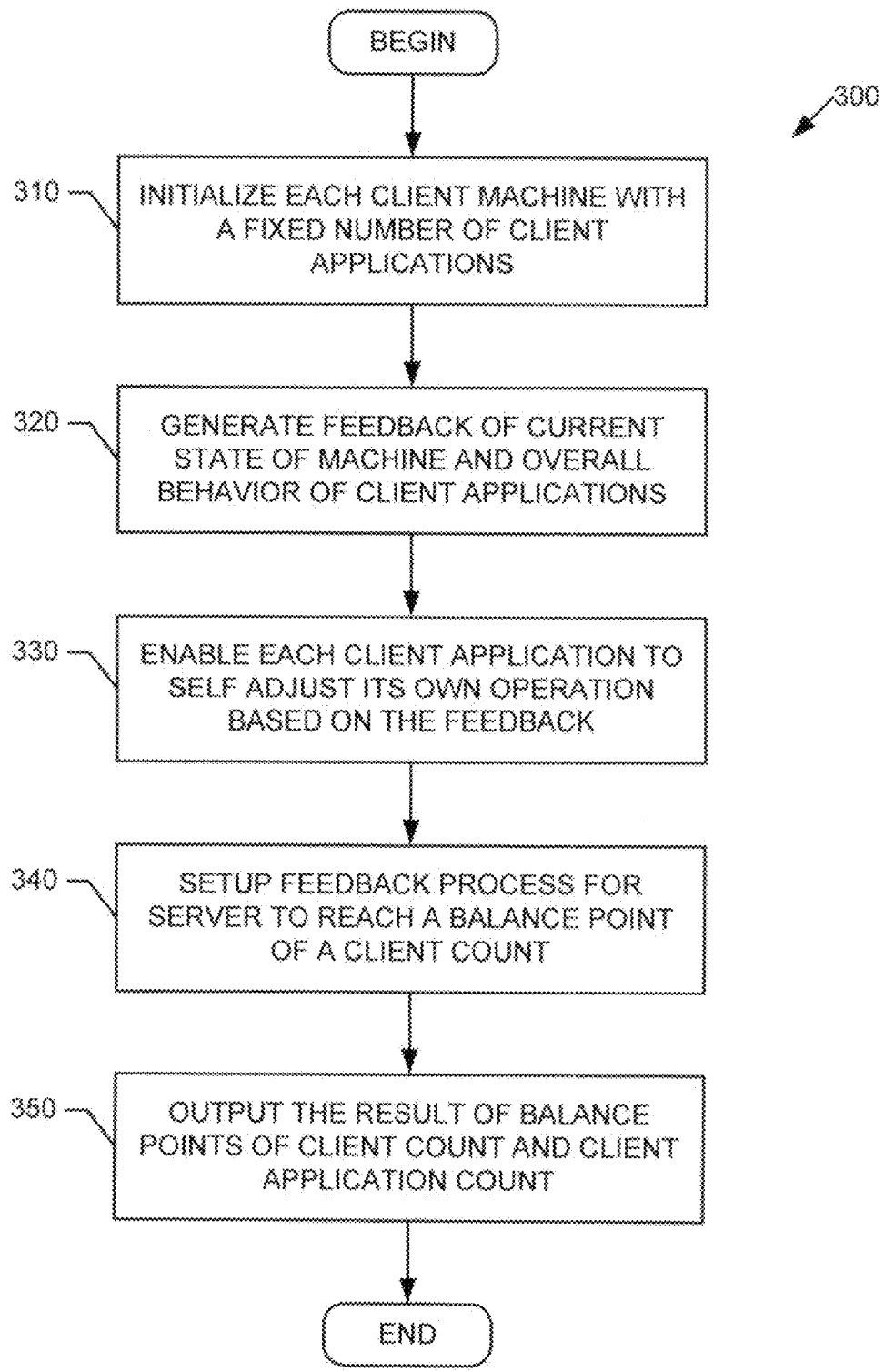
FIG. 3 is a flowchart illustrating a feedback-based method for measuring the performance and capacity of networked servers in accordance with one implementation of the present application.

FIG. 3 is a flowchart illustrating a feedback-based method 300 for measuring the performance and capacity of networked servers in accordance with one implementation of the present application. In the illustrated implementation of FIG. 3, each client machine in the cluster of clients 202 starts with an initial number of client applications, at box 310, where each client application uses an initial count of different type of operations to communicate with a server 206. Each client machine also generates, at box 320, a feedback 214 of the current state of the machine and the overall behavior of the client applications. Based on the feedback 214, each client application self adjust its own operation, at box 330. For example, the client application may decide on its own to change to a different operation type, to exit the test to free up resources for other clients, or to increase the number of client applications on the client machine. Therefore, based on the configured requirements, each machine in the cluster of clients 202 comes to a balance point ($N_b$) of a client application count for that machine. At box 340, a feedback process 212 is set up for a server 206 in which the server 206 and the cluster of clients 202 reach a balance point ($M_b$) of a client count for that server. In one implementation, the balance point of the client count is reached when the maximum count of clients with desired behavior is achieved for the server using the feedback process 212 and the test 204. The result 208 of the balance points of the client count ($M_b$) and the client application count ($N_b$) is output, at box 350, and the measurement of the server capacity and performance is completed automatically without having to perform iterative runs.

There are several advantages of using the above-described feedback-based method of measuring the server capacity and performance. One of the advantages is that the client application count running on each machine is more accurate because each client machine is adjusted individually. Each individual client application behavior is also more tailored towards the running state of the client machine, which makes the server measurement more stable and accurate. The server capacity and performance measurement results are also closer to the actual or real capacity limit and performance metric values. By making the feedback method automatic, the process is much less labor-intensive than the standard iterative method. Further, the testing area of the feedback method is also configurable. For example, different servers can be set with different parameters and the servers can adjust by themselves. The count can be increased and the servers adjust themselves accordingly, and metrics such as CPU load time and internal frame time can be measured more conveniently.

In one implementation, a closed loop feedback approach can be used to the measure performance and capacity of networked servers in a game environment. When running a server for a game environment, for example, a feedback for measurements may include measuring how long it takes for one loop to process or spin in the "main" function loop. This may be referred to as the frame time or the time it takes to process a frame. Minimizing the frame time optimizes the game experience. Also, the frame time is tied to the bandwidth limit in that higher bandwidth leads to the faster frame time. Thus, the bandwidth limit in a game environment can be managed and the bandwidth of each client can be measured or managed.

In one implementation, to measure frame rate, a minimum frame rate is set and that rate is increased until the volume is maximized. The frame rate for multiple clients is then measured at that time. In another implementation, when the client and the server are active, one goal is to minimize the frame time and only run an optimal number of other clients. As the number of clients is increased, it becomes more difficult to obtain accurate measurements. However, by using the feedback-based approach, each client is able to provide a feedback regarding an optimal client count thereby increasing the accuracy of the results.

In an alternative implementation, each server measures its own metrics internally (e.g., performance and capacity) and reports on those metrics when a frame of data is processed. In one implementation, measuring metrics include initializing a program counter, sustaining bandwidth, obtaining a memory footprint, and measuring frame time. In another implementation, application specific metrics include ping time or criteria that session masters within a game may want to maintain.

In a further implementation, virtual clients may be used which may be representations of actual clients. Further, multiple virtual clients may be aggregated into one box for analysis. The box may be geographically placed in a different city or in a location having an optimal data flow through a transport network. The client and server relationship may also be presented by a world-globe structure, where the clients are arranged on the periphery of the globe and in different cities and the information flowing from these different cities may go to various servers located across the world. This could be an issue for servers located in a different geographical regions than where the players are located using them. Latency across different regions in the world may also be optimized and the measurement of performance/capacity may also be the most accurate as well.

Figure 4A:
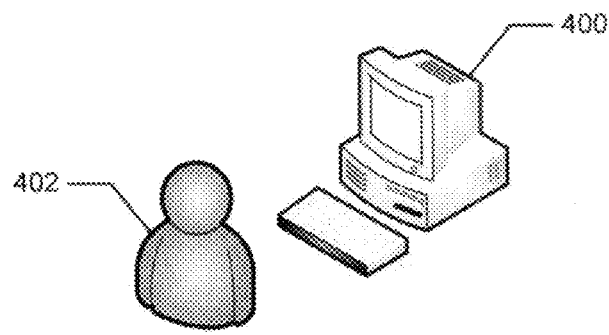
FIG. 4A illustrates a representation of a computer system and a user.

FIG. 4A illustrates a representation of a computer system 400 and a user 402. The user 402 uses the computer system 400 to perform a feedback-based process of measuring the server capacity and performance. The computer system 400 stores and executes a feedback-based measurement process 490.

Figure 4B:
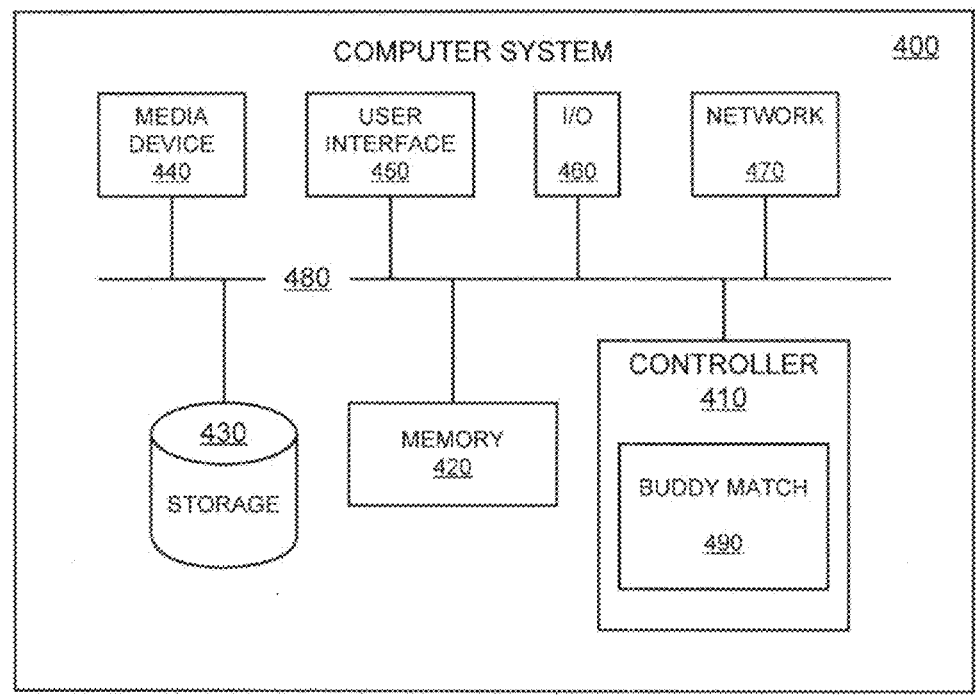
FIG. 4B is a functional block diagram illustrating the computer system hosting the feedback-based measurement process.

FIG. 4B is a functional block diagram illustrating the computer system 400 hosting the feedback-based measurement process 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the feedback-based measurement process 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the buddy match system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss a feedback-based method for measuring the performance and capacity of networked servers. However, in other implementations, the measurements are used to dynamically adjust the configuration of server-client relationships. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A method of measuring performance and capacity of a networked server coupled to a cluster of client machines, the method comprising:
    initializing each client machine of the cluster of client machines with a number of client applications;
    performing a first feedback process of configuring the number of client applications for said each client machine such that each client application adjusts its own operation to achieve a first balance point of a client application count for said each client machine; and performing a second feedback process in which the networked server and the cluster of client machines achieve a second balance point of a client machine count for the networked server, wherein the second feedback process includes a closed loop feedback performed to measure the performance and capacity of the networked server coupled to the cluster of client machines in a game environment, wherein the closed loop feedback also measures a frame time of said each client machine, and wherein the first balance point of the client application count for said each client machine is achieved by minimizing the frame time of said each client machine.

2. The method of claim 1, wherein the adjustment of its own operation by said each client application comprises
changing said each client application to a different operation type.

3. The method of claim 1, wherein the adjustment of its own operation by said each client application comprises
terminating said each client application to free up resources.

4. The method of claim 1, wherein the adjustment of its own operation by said each client application comprises
increasing the number of client applications on said each client machine.

5. The method of claim 1, wherein the second balance point provides a maximum count of client machines with desired behavior coupled to the networked server.

6. The method of claim 1, wherein the first feedback process comprises
feeding back a current state of said each client machine.

7. The method of claim 1, wherein the first feedback process comprises
feeding back overall behavior of the number of client applications.

8. The method of claim 1, further comprising
dynamically adjusting a configuration of a server-client relationship using the first balance point and the second balance point.

9. The method of claim 1, further comprising
configuring a plurality of virtual clients as the cluster client machines.

10. The method of claim 9, wherein the plurality of virtual clients is placed in different geographical locations around the world.

11. A system to measure capacity and performance, comprising:
at least one server arranged in a server feedback loop,
wherein the server feedback loop is configured to achieve a first balance point of a client machine count;
a cluster of client machines coupled to the at least one server, each client machine initialized with a number of client applications and arranged in a client machine feedback loop,
wherein the client machine feedback loop is configured such that each client application adjusts its own operation to achieve a second balance point of a client application count for said each client machine, wherein the client machine feedback loop includes a closed loop feedback performed to measure the performance and capacity of the at least one server coupled to the cluster of client machines in a game environment, wherein the closed loop feedback also measures a frame time of said each client machine, and wherein the second balance point of the client application count for said each client machine is achieved by minimizing the frame time of said each client machine.

12. The system of claim 11, wherein the adjustment of its own operation by said each client application comprises
a modification of said each client application to a different operation type.

13. The system of claim 11, wherein the adjustment of its own operation by said each client application comprises
a termination of said each client application to free up resources.

14. The system of claim 11, wherein the adjustment of its own operation by said each client application comprises
an increase of the number of client applications on said each client machine.

15. A non-transitory computer-readable storage medium storing a computer program, the computer program comprising executable instructions that cause the computer to measure performance and capacity of a networked server coupled to a cluster of client machines, the computer program comprising executable instructions that cause the computer to:
initialize each client machine of the cluster of client machines with a number of client applications;
perform a first feedback process of configuring the number of client applications such that each client application adjusts its own operation to achieve a first balance point of a client application count for said each client machine; and
perform a second feedback process in which the networked server and the cluster of client machines achieve a second balance point of a client machine count for the networked server,
wherein the second feedback process includes a closed loop feedback performed to measure the performance and capacity of the networked server coupled to the cluster of client machines in a game environment, wherein the closed loop feedback also measures a frame time of said each client machine, and wherein the first balance point of the client application count for said each client machine is achieved by minimizing the frame time of said each client machine.

16. The non-transitory storage medium of claim 15, wherein the second balance point provides a maximum count of client machines with desired behavior coupled to the networked server.

* * * * *